United States Patent
Meller et al.

(10) Patent No.: US 9,588,884 B2
(45) Date of Patent: Mar. 7, 2017

(54) SYSTEMS AND METHODS FOR IN-PLACE REORGANIZATION OF DEVICE STORAGE

(71) Applicant: Red Bend Ltd., Hod Hasharon (IL)

(72) Inventors: Evyatar Meller, Yad Binyamin (IL); Yoav Salarios, Hod Hasharon (IL)

(73) Assignee: RED BEND LTD., Hod Hasharon (IL)

( * ) Notice: Subject to any disclaimer, the term of this patent is extended or adjusted under 35 U.S.C. 154(b) by 600 days.

(21) Appl. No.: 13/827,151

(22) Filed: Mar. 14, 2013

(65) Prior Publication Data

US 2014/0281125 A1 Sep. 18, 2014
US 2016/0170869 A9 Jun. 16, 2016

Related U.S. Application Data

(60) Provisional application No. 61/664,634, filed on Jun. 26, 2012.

(51) Int. Cl.
*G06F 12/02* (2006.01)
*G06F 3/06* (2006.01)
*G06F 9/445* (2006.01)

(52) U.S. Cl.
CPC ........ *G06F 12/0246* (2013.01); *G06F 3/0608* (2013.01); *G06F 3/0644* (2013.01); *G06F 3/0679* (2013.01); *G06F 3/0604* (2013.01); *G06F 8/65* (2013.01); *G06F 8/665* (2013.01); *G06F 2212/7202* (2013.01)

(58) Field of Classification Search
CPC ........ G06F 12/0246; G06F 8/665; G06F 8/68; G06F 8/71; G06F 3/0644; G06F 3/0604; G06F 3/0608; G06F 3/0679
See application file for complete search history.

(56) References Cited

U.S. PATENT DOCUMENTS

| | | | |
|---|---|---|---|
| 6,018,747 A * | 1/2000 | Burns et al. | |
| 6,185,575 B1 * | 2/2001 | Orcutt | |
| 6,330,653 B1 * | 12/2001 | Murray et al. | 711/173 |
| 2005/0027758 A1 * | 2/2005 | Meller et al. | 707/204 |
| 2005/0132179 A1 * | 6/2005 | Glaum et al. | 713/1 |
| 2007/0050430 A1 * | 3/2007 | Meller et al. | 707/203 |

(Continued)

*Primary Examiner* — Yaima Rigol
*Assistant Examiner* — Glenn Gossage
(74) *Attorney, Agent, or Firm* — Buchanan Ingersoll & Rooney PC

(57) ABSTRACT

A method, and system for carrying out the method, for in-place reorganization of content, organized according to an original organization scheme, which is stored in a non-volatile storage of a device, to a target organization scheme. The method includes obtaining instructions to reorganize the content to a defined target organization scheme. The method further includes (i) generating, based on the instructions and applying target organization logic to a virtual storage, a sequence of update commands for generating, in the non-volatile storage, at least one target storage unit organized according to the defined target organization scheme, and (ii) executing the update commands on the non-volatile storage. Potential write-before-read conflicts may be identified based on the sequence of update commands, and potential conflicts resolved by reordering, adding, deleting, altering commands, and/or backing up content. The instructions may include instructions to repartition the nonvolatile storage from an original partition layout to a defined target partition layout.

26 Claims, 6 Drawing Sheets

(56) References Cited

U.S. PATENT DOCUMENTS

| | | | |
|---|---|---|---|
| 2008/0172584 A1* | 7/2008 | Meller et al. | 714/702 |
| 2008/0196019 A1* | 8/2008 | Meller et al. | 717/168 |
| 2010/0185921 A1* | 7/2010 | Meller et al. | 714/763 |
| 2011/0093841 A1* | 4/2011 | Meller et al. | 717/168 |
| 2011/0208929 A1* | 8/2011 | McCann | 711/162 |

* cited by examiner

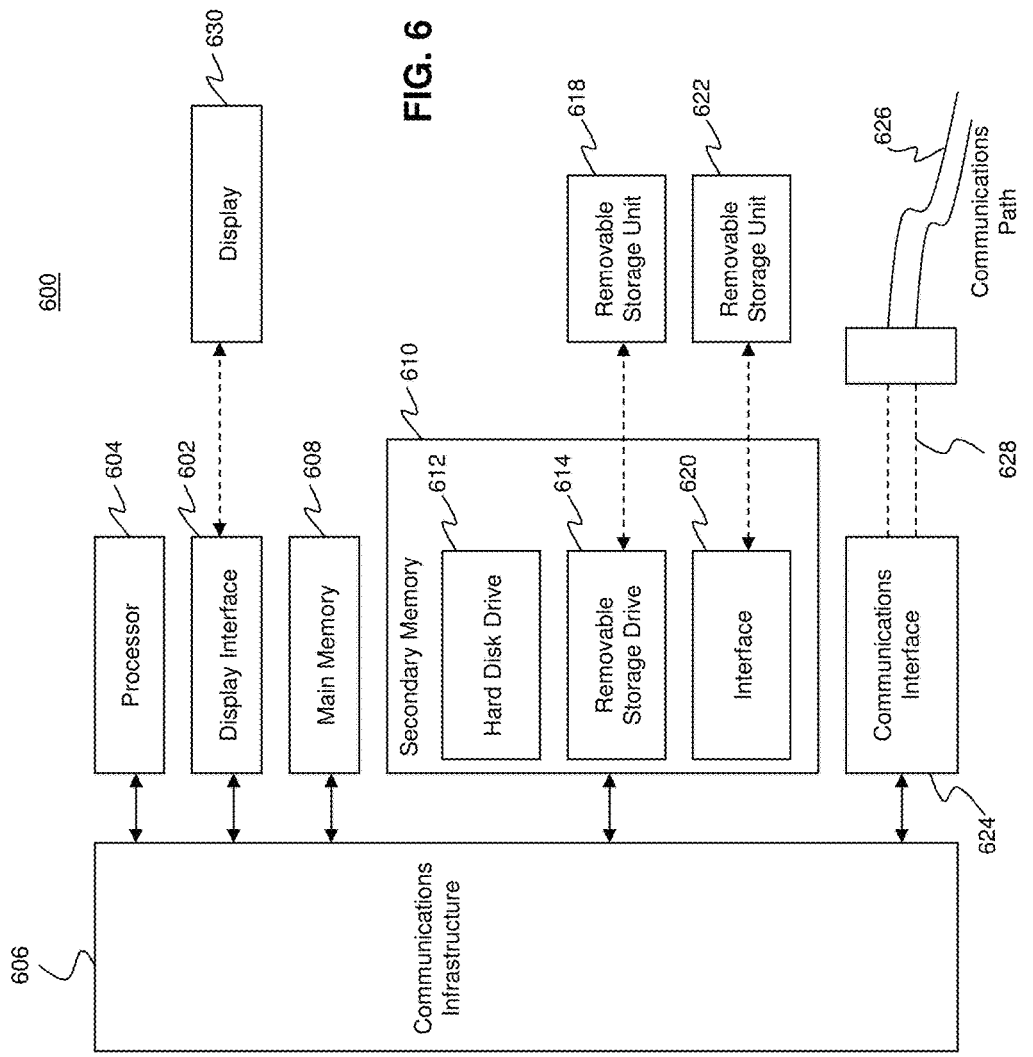

SYSTEMS AND METHODS FOR IN-PLACE REORGANIZATION OF DEVICE STORAGE

RELATED APPLICATIONS

The present application claims the priority benefit of U.S. Provisional Patent Application No. 61/664,634 entitled "Systems and Methods for In-Place, Dynamic Reorganization of Device Storage," filed Jul. 18, 2012, which is herein incorporated by reference in its entirety.

FIELD

The present disclosure relates to the in-place reorganization of content stored in a storage device, specifically, the in-placed updating of an original version of content of a non-volatile storage device into an updated version.

BACKGROUND

Computer storage, such as hard disk or flash memory, is typically split into several partitions. Each of these partitions store data in a specific format, commonly referred to as a file system format. It may sometimes be required to change sizes of one or more of the partitions in order to allow for more content to be stored in a particular partition, or to move content from one partition to another. In some instances, such repartitioning or reorganization may also be required in order to free storage space for performance reasons, such as with the defragmentation of a hard disk drive, or to resize file system partitions.

With many types of devices, it may also be required to update content stored in the storage units of such devices. For example, stored content may need to be updated in order to perform an upgrade or update of a software application or an operating system (OS). Such upgrades may include major updates required to fix a problem or bug, to introduce new features, or to replace an existing OS with a new OS or updated version. These upgrades typically replace existing executable files and libraries (e.g., shared libraries) corresponding to the OS or software application being upgraded. In some instances, many different types of content may need to be updated, such as text, source code, data stored in a database, etc.

Traditional techniques for reorganization of stored content may often require significant extra storage space and/or downtime for the device containing the content storage unit. In many instances, these conventional techniques may require additional storage space or as much free storage space available as the content to be reorganized, in order to store a full copy of the content. This may be a problem for devices that do not have access to a significant amount of extra storage space, such as may be the case with mobile devices, such as smart phones.

Accordingly, there is a need for a technical solution to provide the in-place repartitioning or reorganization of an original version of content in a storage device into an updated version of the content that reduces the need for backup storage.

SUMMARY

The present disclosure provides a description of systems and methods for the in-place reorganization of content stored in a non-volatile storage of a device and reorganized according to an original organization scheme into a target organization scheme having at least one target storage unit and a target organization logic.

A method for in-place reorganization of content stored in a non-volatile storage of a device and organized according to an original organization scheme having at least one original storage unit and on original organization logic associated therewith, to a target organization scheme having at least one target storage unit and a target organization logic associated therewith, includes: obtaining instructions to reorganize the content in the non-volatile storage from the original organization scheme to a defined target organization scheme; generating, on the device, based on the instructions and the applying of the target organization logic to a virtual storage, a sequence of update commands for generating in the non-volatile storage the at least one target storage unit organized according to the target organization scheme; and executing the update commands on the non-volatile storage.

A non-transitory compute readable medium has program logic stored thereon that, if executed by a device having a physical storage with an original organization scheme including a plurality of storage units each having a respective, original organization logic associated therewith, cause the device to perform in-place reorganization of the physical storage to a target organization scheme, wherein the program logic includes: program logic for obtaining instructions to reorganize the physical storage from the original organization scheme to a defined target organization scheme having a plurality of target storage units, each having a respective, target organization logic associated therewith; program logic for generating, on the device, based on the instructions and simulating the organization logics, a sequence of update commands for generating the plurality of target storage units in the physical storage; program logic for identifying, based on the sequence of update commands, potential write-before-read conflicts that may result in data in the physical storage being overwritten if the update commands are carried out; program logic for resolving the identified potential write-before-read conflicts; and program logic for executing the update commands on the physical storage.

A system for in-place reorganization of non-volatile storage of a mobile device having an original organization scheme to a target organization scheme having at least one target storage unit and a target organization logic associated therewith, includes a receiving module, a generation module, a conflict identification module, a conflict resolution module, and an execution module. The receiving module is configured to receive or obtain instructions to reorganize the non-volatile storage from the original organization scheme to a defined target organization scheme having at least one target storage unit and a target organization logic associated therewith. The generation module is configured to generate, on the mobile device, based on the instructions and simulating the organization logics, a sequence of update commands for generating the at least one target storage unit in the non-volatile storage. The conflict identification module is configured to invoke the organization logics to identify, based on the sequence of update commands, potential write-before-read conflicts that may result in data in the non-volatile storage being overwritten if the update commands are carried out. The conflict resolution module is configured to resolve the identified potential write-before-read conflicts by re-sequencing the update commands associated with identified conflicts. The execution module is configured to execute the update commands on the non-volatile storage.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 6 is a block diagram illustrating a computer system architecture in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for In-Place Reorganization of Stored Contents

Figure 1:
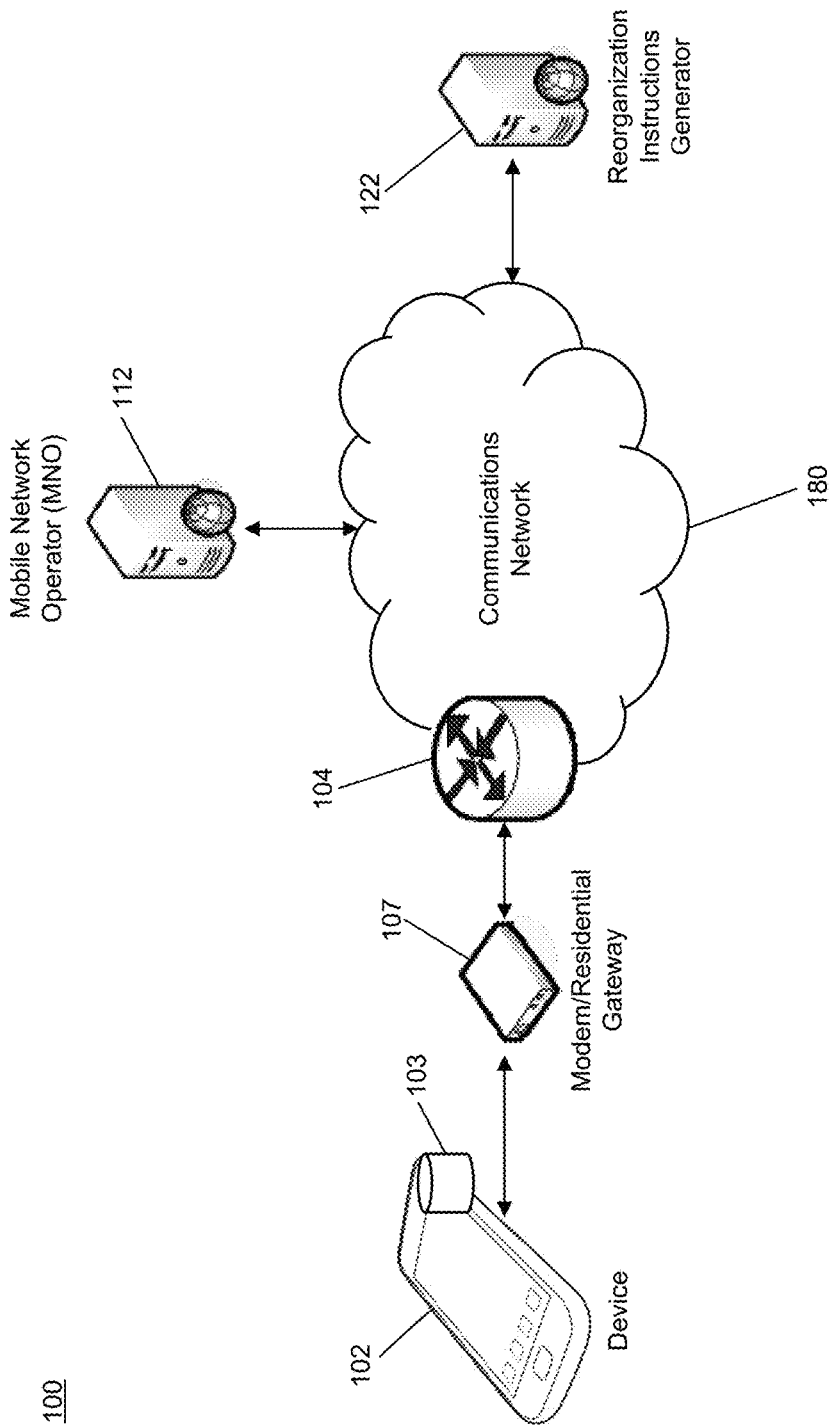
FIG. 1 is a schematic illustration of a system for reorganizing storage on a device in a network in accordance with exemplary embodiments.

FIG. 1 is a schematic diagram illustrating an exemplary reorganization system 100 in accordance with exemplary embodiments. The reorganization system 100 may include a communications network 180, which may be associated with a mobile network operator (MNO) 112. The communications network 180 may be configured to facilitate communication between the MNO 112 and one or more devices 102. The device 102 may be configured to access the communications network 180 via a modem/residential gateway 107 and/or a router 104. The communications network 180 may also be connected with a reorganization instructions generator 122. Although the system 100 of FIG. 1 is illustrated as including only a single MNO 112 and communications network 180, it should be understood that the reorganization system 100 may include a plurality of MNOs 112 that are in turn associated with multiple communication networks 180. Similarly, a plurality of reorganization instructions generators 122 may be used.

The device 102 may be any type of device suitable for performing the functions as disclosed herein as will be apparent to persons having skill in the relevant art, such as a desktop computer, laptop computer, tablet computer, cellular phone, smart phone, etc, or any other type of embedded device such as meters, medical devices, implantables, etc. Exemplary embodiments of the device 102 are discussed in more detail below with respect to FIGS. 3 and 6. The device 102 may include a non-volatile storage 103. The non-volatile storage 103 may store content, which may be content for which the in-place reorganization is sought. The device 102 may be configured to reorganize the stored content from an old or original version into a new version.

As used herein, the terms "old version" or "original version" may refer to a version of content before an update. The terms "new version," "target version," or "updated version" may refer to a version of content that includes already updated content. It should be noted that the updated content may be further updated, and that in such an instance, the first or prior update would constitute old content, and the second or subsequent update would constitute new content.

To perform the reorganization of the original content stored in the non-volatile storage 103, the device 102 may receive reorganization instructions from the reorganization instructions generator 122 via the communications network 180. In some embodiments, the reorganization instructions may be transmitted by the reorganization instructions generator 122 to the device 102 (e.g., push from a server). In other embodiments, the reorganization instructions may be actively requested and/or obtained by the device 102 from the reorganization instructions generator 122 (e.g., pull from a device). In one embodiment, the reorganization instructions may be embedded in the device 102, such as in a partition in the non-volatile storage 103 or in a separate storage. In another embodiment, the reorganization instructions may be generated by the device 102, such as by logic executed in the device 102.

The device 102 may then use the obtained instructions to generate an update package comprising a sequence of update commands, whose execution may result in the target organization scheme, wherein each reorganization instruction is the basis of one or more update commands to be executed in sequence on the device 102. In some embodiments, the reorganization instructions may include one or more of: move, reformat, change format, defragment, create, resize, and delete instructions. In some instances, the reorganization instructions may identify a specific partition included in the non-volatile storage 103.

The device 102 may then initiate a reorganization process, whereby the device 102 applies the generated sequence of update commands in the defined sequence in order to in-place update original content stored in the non-volatile storage 103 into updated content in the non-volatile storage 103. In some embodiments, the device 102 may apply update commands generated from a plurality of update packages. In some instances, the reorganization instructions may be transmitted to the device by the MNO 112, acting as or on behalf of the reorganization instructions generator 122. For example, the MNO 112 may transmit reorganization instructions to update an operating system (e.g., Android, iOS, Linux, Windows, etc.) on a smart phone that operates on a communications network 180 associated with the MNO 112.

The update commands generated and/or applied by the device 102 may be conceptualized as "delta update commands" used for update commands that can be applied to handle delta updates without having to provide a full new version of the content to be reorganized, and instead only providing differences (e.g., deltas) between the old version of the content and new version of the content. Example systems and methods for generating update packages for use in in-place updating of contents of a storage device are described in U.S. patent application Ser. No. 11/652,147 entitled "Method and System for In-Place Updating Content Stored in a Storage Device," filed Jan. 11, 2007 (published as U.S. Patent Application Publication No. 2008/0172584), now abandoned; U.S. patent application Ser. No. 11/997,134

(now U.S. Pat. No. 9,043,680) entitled "Method and System for In-Place Updating Content Stored in a Storage Device," filed Feb. 7, 2010; U.S. patent application Ser. No. 11/578,345 (now U.S. Pat. No. 8,453,138) entitled "Method and Apparatus for Generating an Update Package," filed Nov. 9, 2007; and U.S. patent application Ser. No. 12/947,322 (now U.S. Pat. No. 8,341,113) entitled "Method and System for Updating Versions of Content Stored in a Storage Device," filed Nov. 16, 2010, all of which are herein incorporated by reference in their entirety.

Non-Volatile Storage

Figure 2:
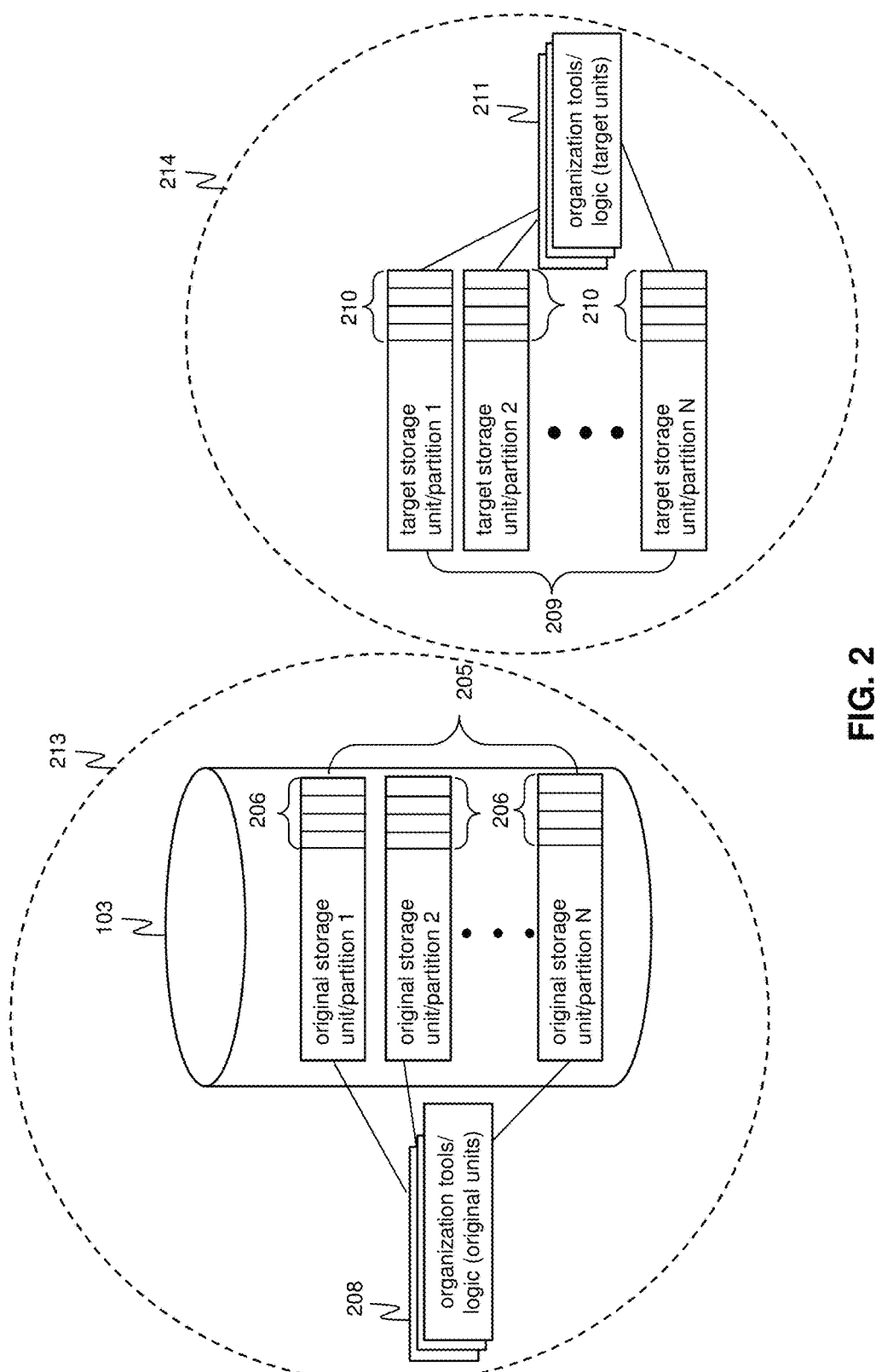
FIG. 2 is a block diagram illustrating a non-volatile storage comprising original storage units of an original organization scheme and target storage units of a target organization scheme for reorganizing via the system of FIG. 1 in accordance with exemplary embodiments.

FIG. 2 illustrates components of the non-volatile storage 103 of the device 102 and storage organization schemes. It should be apparent to persons having skill in the relevant art that FIG. 2 is provided as a means of illustration only and the non-volatile storage 103 may not be limited to the illustrated embodiment.

The non-volatile storage 103 may include original storage units 205 of an original organization scheme 213. The original organization scheme 213 may be formed by the original storage units 205 and their corresponding one or more data blocks (e.g., data blocks, file contents, etc.) 206, and original organization tools (e.g., organization logic, program logic, etc.) 208. As illustrated in FIG. 2, the original organization tools 208 may correspond to each of the original storage units 205. In some embodiments, multiple original storage units 205 may share a single organization tool 208, such as in instances where the multiple original storage units 205 share the same file system or structure. It should also be noted that, although the original organization scheme 213 is illustrated as including a plurality of original storage units 205, the original organization scheme 213 may be formed with respect to a single original storage unit 205.

The non-volatile storage 103 may be reorganized by the device 102, based on the generated sequence of update commands, based on a target organization scheme 214. The target organization scheme 214 may be formed by one or more target storage units 209, their corresponding one or more data blocks 210, and target organization tools 211 corresponding to each of the target storage units 209.

The device 102 may apply the generated update commands in the determined sequence such that the non-volatile storage 103 having the original organization scheme 213 may be reorganized into the one or more target storage units 209 based on the target organization scheme 214. The reorganization of the stored content based on organization schemes is discussed in more detail below with respect to FIG. 5.

The original organization tools 208 may correspond to data formats and file systems used by software applications and/or the operating system installed on the device 102. For example, an original organization tool 208 of the original organization scheme 213 may comprise organization logic or program logic from a database management system (e.g., SQL, ORACLE®, etc.), a web server (e.g., Apache, etc.), or may be tools specific to a file system (e.g., New Technology File System, File Allocation Table, fourth extended file system, Hierarchical File System, etc.), such as the file system utilized by the corresponding at least one original storage unit 205. The organization tools and logics may include any logic and/or additional data representing how data blocks 206, and/or file or data objects included therein in a given storage unit, are accessed.

In-Place Reorganization of Storage Contents in a Wireless Network

Figure 3:
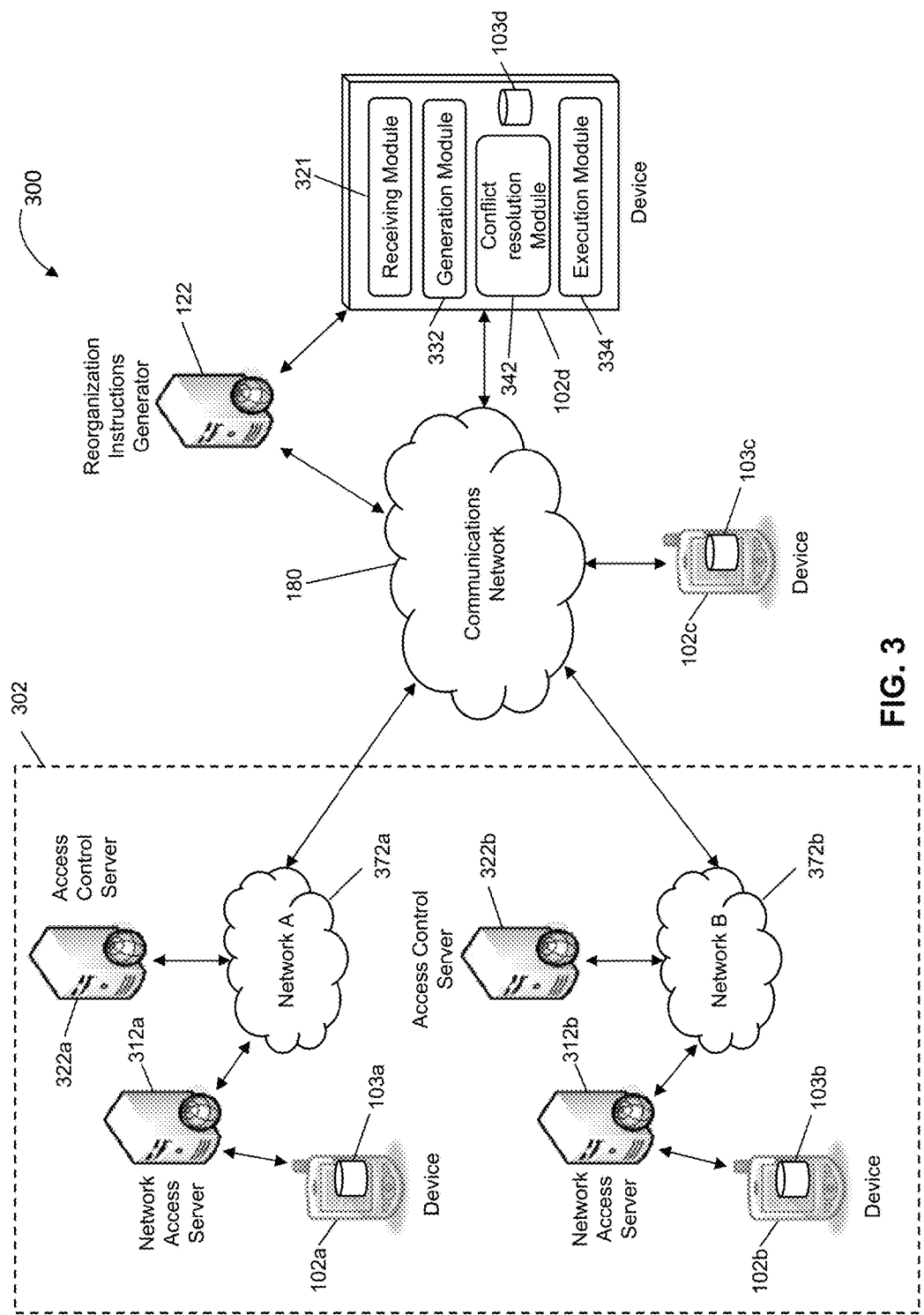
FIG. 3 is a schematic illustrating of a system for reorganizing storage of devices in wireless networks in accordance with exemplary embodiments.

FIG. 3 illustrates a system 300 for the in-place reorganization of content stored in non-volatile storage of mobile devices in a wireless network environment.

The system 300 may include a plurality of devices 102 (illustrated in FIG. 3 as devices 102a-102d), such as cellular phones, smart phones, tablet computers, netbook computers, laptop computers, personal digital assistants (PDAs), etc. Each device 102 may include a non-volatile storage 103 (illustrated in FIG. 3 as 103a-103d), which may be configured to store content to be reorganized based on a sequence of update commands generated based on reorganization instructions.

In some instances, devices 102a, 102b in the system 300 may be configured to communicate with a wireless network (e.g., wireless network A (372a), wireless network B (372b)) via a wireless communication protocol. Such mobile communication devices 102a, 102b and wireless networks 372a, 372b may be a part of a wireless environment 302 serviced by a service provider. In one embodiment, the service provider may be an MNO, such as the MNO 112. The wireless networks (372a, 372b) may be configured to communicate with the reorganization instructions generator 122 via the communications network 180. The system 300 may also include devices 102a, 102b communicating directly with the communications network 180, similar to the system 100 in FIG. 1 discussed above.

The devices 102a, 102b in the wireless environment 302 may be configured to communicate with the corresponding wireless network (e.g., wireless network 372a, wireless network 372b) via a network access server (e.g., network access server 312a, network access server 312b, etc.). The network access server may authenticate the devices 102a, 102b prior to allowing communication to/from the devices 102a, 102b, such as for security reasons. The network access server may receive requests from the devices 102a, 102b and may provide access to the wireless networks 372a, 372b to the corresponding devices. In some embodiments, the network access servers 312a, 312b may be further configured to generate an access request message, which is then transmitted to an access control server (e.g., access control server 322a, access control server 322b, etc.). The format of the access request message may vary depending on the wireless protocol being used by the network access server to authenticate the user. Suitable formats for the access request message will be apparent to persons having skill in the relevant art and may include, for example, dynamic host configuration protocol (DHCP), remote authentication dial in user service (RADIUS), terminal access controller access control system (TACACS), etc.

The access control server (e.g., access control server 322a, access control server 322b) may be configured to receive the access request messages and forward the access request messages and/or data included in the access request messages to the appropriate service provider (e.g., the MNO 112). The access control server may be further configured to perform authentication and to process access control for at least one format. In some instances, the wireless network may include multiple access control servers configured to receive access request messages for each of a number of formats.

To reorganize content stored in the non-volatile storage (e.g., non-volatile storage 103a, non-volatile storage 103b) of a device (e.g., device 102a, 102b, etc.), the device may request or may receive reorganization instructions from the reorganization instructions generator 122. In order to carry out this process, the device, such as the device 102a, may request access to the wireless network 372a via the network access server 312a. The network access server 312a may generate an access request message and transmit the message to the access control server 322a via the wireless network 372a. The access control server 322a may process the access request message and indicate to the network access server 312a that the user/device has been authenticated, which may then in turn provide the device 102a with access to the wireless network 372a. The device 102a may then communicate with the reorganization instructions generator 122 via the wireless network 372a and the communications network 180 to request and/or receive reorganization instructions.

It will be apparent to persons having skill in the relevant art that, in some embodiments, the wireless network may be the communications network 180 and/or the reorganization instructions generator 122 may communicate directly with the wireless network. In other embodiments, a device, such as the device 102c, may communicate directly with the communications network 180. In yet another embodiment, a device, such as the device 102d, may be configured to communicate directly with the reorganization instructions generator 122.

Device

FIG. 3 includes an exemplary embodiment of a device for use in the systems 100 and 300, illustrated as the device 102d in FIG. 3. The device 102d may include a receiving module 321, a generation module 332, a conflict resolution module 342, and an execution module 334. The device 102d may also include the non-volatile storage 103 for storing the content to be reorganized.

The receiving module 321 may be configured to receive and/or obtain instructions to reorganize the content in the non-volatile storage from the reorganization instructions generator 122. In some instances, the receiving module 321 may request (e.g., pull) the reorganization instructions from the reorganization instructions generator 122. In other instances, the receiving module 321 may receive the reorganization instructions transmitted by (e.g., pushed by) the reorganization instructions generator 122 without a prior request. It will be apparent to persons having skill in the relevant art that, in some embodiments, the receiving module 321 may receive the reorganization instructions from another entity acting as or on behalf of the reorganization instructions generator 122, such as the MNO 112, another device (e.g., device 102a, 102b, etc). In one embodiment, the reorganization instructions may be generated internally by the device 102d, such as by the generation module 332. In a further embodiment, the device 102d may be configured such that reorganization instructions for reconfiguring/resizing a partition are generated (e.g., automatically) when the partition is nearing capacity.

The generation module 332 may be configured to generate, based on the reorganization instructions, a sequence of update commands that, when applied to the device 102d, will reorganize the content stored in the non-volatile storage 103d from the original organization scheme 213 having one or more original storage units 205 and corresponding original organization tools 208 to the target organization scheme 214 having one or more target storage units 209 and corresponding target organization tools 211. To generate the sequence of update commands, the generation module 332 may utilize a virtual storage, such as by virtually writing the content stored in the non-volatile storage 103d to a virtual storage based on the target organization scheme 214 and simulating the target organization tools 211. The generation module 332 may then capture the content virtually written to the target storage unit and detect its target location without necessarily writing to the non-volatile storage. The generation module 332 may then also decide whether the captured content was original content stored according to the original organization scheme 213 and its original location. If the captured content was original content, then the generation module 332 may generate a copy update command, to copy the content from its original location to the detected target location. If the content was not part of the original content in the original organization scheme 213 (e.g., it was generated by the target organization scheme 214 for management), then an insert update command may be generated to insert the actual content to the detected target location.

In some instances, when updating the stored content in the non-volatile storage 103d from an original organization scheme 213 to a target organization scheme 214, update commands may be configured to use the original content in order to generate the updated content. For example, original content stored in a first location in the non-volatile storage 103d may be copied to a new location, which constitutes a part of the updated content. In such an instance, the new location may have been used previously to store other original content. In such an instance, the content that is copied into the new location may overwrite the original content in that new location. If the original content in that new location is to also be copied and utilized as part of the new content, then the situation may arise where that original content is overwritten prior to its copying. In such an instance, a write-before-read (WbR) conflict occurs, and absent resolution, the original content in the new location may be overwritten and lost.

The conflict resolution module 342 may be configured to identify, based on the generated sequence of update commands, potential WbR conflicts. The conflict resolution module 342 may be further configured to resolve the potential WbR conflicts by performing one of: reordering the sequence of update commands, backing up content corresponding to an identified potential WbR conflict to a designated backup area in the non-volatile storage 103d, deleting update commands, and altering update commands. In some instances, the conflict resolution module 342 may be configured to identify potential WbR conflicts as part of the sequence of update commands. For example, while executing the update commands, the conflict resolution module 342 may identify that the next update command in the sequence to be executed may result in a WbR conflict, and may identify a resolution to the conflict on the fly before the sequence of update commands continues. In a further instance, the sequence of update commands may continue on to execute other subsequent commands in the sequence where WbR conflicts do not arise, while the identified WbR conflict is being resolved. Additional information regarding WbR conflicts and the resolution thereof is described in U.S. Pat. No. 6,018,747 entitled "Method for Generating and Reconstructing In-Place Delta Files," issued Jan. 25, 2000, and U.S. patent application Ser. No. 11/508,337 (now U.S. Pat. No. 8,561,049) entitled "Method and System for Updating Content Stored in a Storage Device," filed Aug. 23, 2006, which are each herein incorporated by reference in their entirety.

In instances where the content of a segment (e.g., a storage unit, data block 206, etc.) in the updated version corresponds to a segment in the original version, the segments may be considered to be corresponding segments or matched segments. Correspondence may refer to any logic or arithmetic connection between the segments, wherein the updated segment may be a copy of the original segment, a modified copy of the original segment, content received by computing the content of the updated segment based on the content of the original segment, etc. In some instances, more than one updated segment may correspond to a single original segment, or a single updated segment may correspond to more than one original segment.

The execution module 334 may be configured to execute the sequence of update commands on the non-volatile storage 103d. In some embodiments, the execution module 334 may execute the sequence of update commands following the resolution of identified potential WbR conflicts by the conflict resolution module 342. In other embodiments, the execution module 334 may execute the sequence of update commands concurrently or intermittently with the resolution of WbR conflicts by the conflict resolution module 342.

It will be apparent to persons having skill in the relevant art that the device 102d may include additional modules or that the modules illustrated in FIG. 3 as being included in the device 102d may be combined and/or configured to perform the functions of more than one module. In addition, the modules included in the device 102d may be configured to perform additional functions as discussed in more detail below and as will be apparent to persons having skill in the relevant art.

The device 102d may be configured to provide for reliable/failsafe reorganization of the content stored in the non-volatile storage 103d. For the reorganization to be considered reliable, the associated update process should be able to be resumed even subsequent to an interruption which causes volatile memory to be erased and/or a block in storage to be corrupted (e.g., failsafe operations). In some instances, failsafe update of content stored in the non-volatile storage 103d may include the backing up of any content prior to the content being written in the non-volatile storage 103d. In such an instance, any interruption or error resulting in damage (e.g., corruption, loss, etc.) to the memory may be remedied by the backed up content.

It will be apparent to persons having skill in the relevant art that a variety of techniques may be used to optimize the usage of backup memory used in reliable or failsafe update. Suitable systems and methods for use in optimizing backup memory are disclosed in more detail in U.S. patent application Ser. No. 11/508,337, (now U.S. Pat. No. 8,561,049) entitled "Method and System for Updating Content Stored in a Storage Device," to Evyatar Meller et al., filed Aug. 23, 2006, and U.S. patent application Ser. No. 11/997,134 (now U.S. Pat. No. 9,043,680), entitled "Method and System for In-Place Updating Content Stored in a Storage Device," to Evyatar Meller et al., filed Feb. 7, 2010, which are herein incorporated by reference in their entirety.

Reorganization of Content in Non-Volatile Storage

Figure 4:
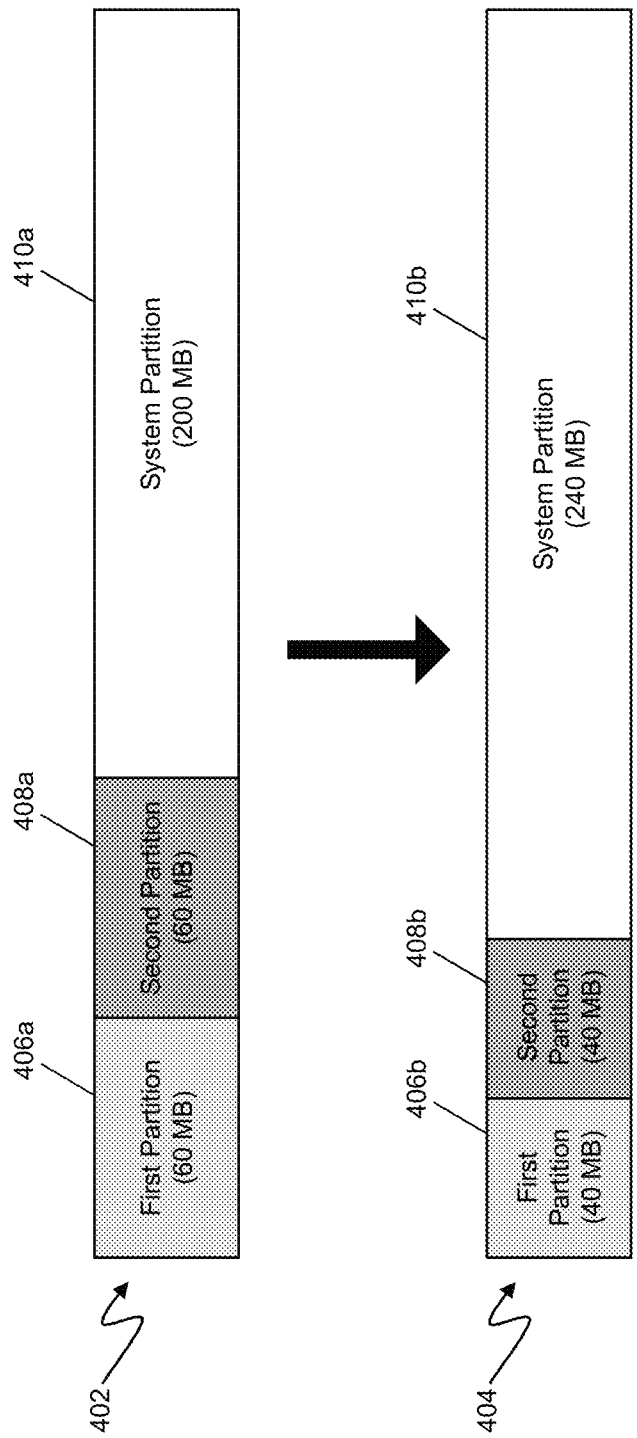
FIG. 4 is an illustration of an original file system partition layout and target file system partition layout in accordance with exemplary embodiments.

FIG. 4 is an illustration of a file system layout in the non-volatile storage 103 of the device 102.

As illustrated in FIG. 4, the non-volatile storage 103 may store content in an original version 402, which may be stored based on an original organization scheme 213. The original version 402 may include a plurality of storage units/partitions, such as the first partition 406a, second partition 408a, and system partition 410a. Each partition may be a single storage unit or partition (e.g., original storage unit 205), may be comprised of multiple storage units or partitions, or may be comprised of one or more data blocks (e.g., data blocks 206).

The device 102 may be configured to reorganize the original version 402 of the stored content based on the original organization scheme 213 to an updated version 404 based on a target organization scheme 214. The device 102 may generate and execute a sequence of update commands based on reorganization instructions such that the content stored in the non-volatile storage 103 may be updated from the original version 402 to the updated version 404.

In the updated version 404, the non-volatile storage 103 may still include the first partition 406b, second partition 408b, and system partition 410b. As illustrated in FIG. 4, the sizes of each of the partitions 406b, 408b, and 410b in the updated version 404 may differ from the sizes of the corresponding partitions 406a, 408a, and 410a in the original version 402, such as a result of the target organization scheme 214 and/or corresponding target organization tools 211. In such an instance, the non-volatile storage 103 may be reorganized based on the target organization scheme 214 to increase and/or decrease the size of specific partitions.

For example, the non-volatile storage 103 of the device 102 may include a system partition, such as the system partition 410a, for storing an operating system (OS). The OS may be of a size where the system partition 410a must be 200 megabytes in order to store the operating system. The non-volatile storage 103 may also include a first partition 406a, such as a partition for user storage, and a second partition 408a, such as a partition for application programs provided by a service provider (e.g., the MNO 112). Each of the first and second partitions 406a and 408a may be 60 megabytes.

The developer of the OS may release an update for the OS, such as to fix bugs and add new features. The new version of the OS may require an increase in the available storage space, such as an increase to 240 megabytes. In order to accommodate the new version of the OS, the non-volatile storage 103 may need to be updated such that the system partition includes at least the 240 megabytes required. The receiving module 321 of the device 102 may receive and/or obtain reorganization instructions for reorganizing the non-volatile storage 103 to accommodate the updated version of the OS.

The generation module 332 may generate a sequence of update commands based on the reorganization instructions, the conflict resolution module 342 may identify and resolve any potential WbR conflicts based on the sequence of update commands, and the execution module 334 may execute the sequence of update commands on the non-volatile storage 103. The update commands, once executed, may result in the original version 402 of the non-volatile storage 103 being reorganized into the updated version 404. As part of the reorganization, the 60 MB first partition 406a may be shrunk into a 40 MB partition 406b, the second partition 408a may be similarly shrunk from 60 MB to the 40 MB partition 408b, and the system partition 410a may be increased to the required 240 MB as illustrated in the system partition 410b in the updated version 404.

Exemplary Method for In-Place Reorganization of Stored Contents

Figure 5:
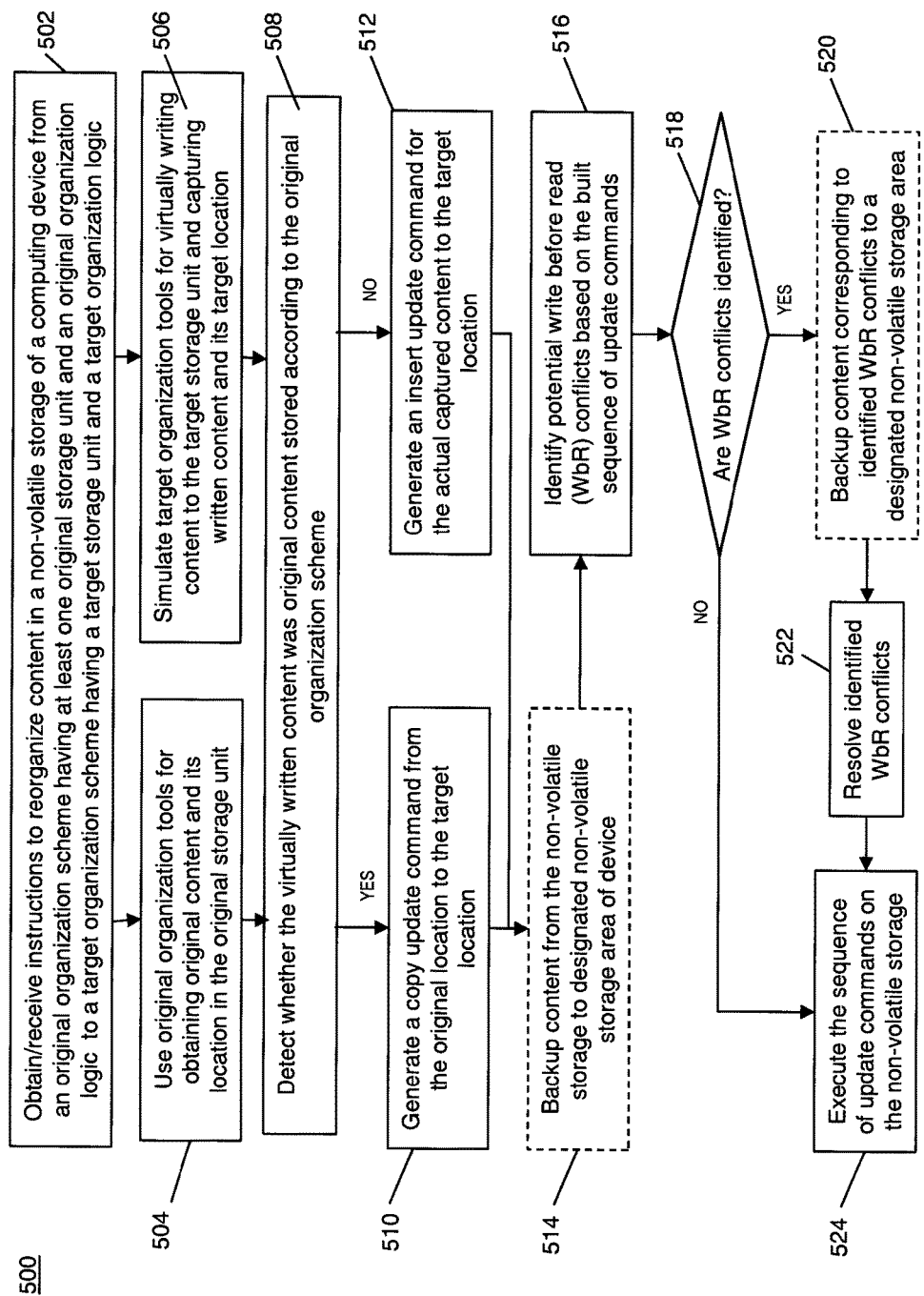
FIG. 5 is a flow chart illustrating an exemplary method for in-place reorganization of storage of a device in accordance with exemplary embodiments.

FIG. 5 illustrates a first exemplary method 500 for the in-place reorganization of content stored in the non-volatile storage 103 of the device 102.

In step 502, reorganization instructions may be received and/or obtained (e.g., by the receiving module 321) for the reorganization of content stored in the non-volatile storage 103 from an original organization scheme 213 having at least one original storage unit 205 and an original organization logic 208 associated therewith to a defined target organization scheme 214 having at least one target storage unit 209 and a corresponding target organization tool or logic 211 associated therewith. In some embodiments, the device 102 may request the instructions, such as from the reorganization instructions generator 122. In other embodiments, the reorganization instructions may be transmitted to the device 102 without a prior request. In another embodiment, the reorganization instructions may be generated internally by the device 102 in accordance with an internal rule.

In one embodiment, at least one original storage unit 205 or target storage unit 209 may not be contiguous in the non-volatile storage 103. In some embodiments, the non-volatile storage 103 may include a plurality of partitions (e.g., original storage units 205), each partition having a respective original organization tool or logic 208 associated therewith. In such an embodiment, the original organization scheme 213 and target organization scheme 214 may each include a partition layout, which may include at least the size, location, and format of each partition of the plurality of partitions, and the reorganization instructions may include instructions to reorganize (e.g., repartition) the non-volatile storage 103 from the original partition layout to the target partition layout. In a further embodiment, the instructions may include at least one of: move, reformat, change format, defragment, create, resize, delete, and update commands for respective partitions of the plurality of partitions. In another further embodiment, the plurality of partitions may include at least one file system partition storing data in a specific file system format.

In step 504, the original organization tools or logic 208 of the original organization scheme 213 may be used to obtain the original content and its location in the original storage unit 205. In step 506, the target organization tools or logic 211 of the target organization scheme 214 may be simulated for virtually writing the content obtained in step 504 to a virtual storage for detecting the target location in the corresponding target storage units 209. Note that inputting the target organization tool 211 with content to write (e.g., virtually) to the target units outputs the input content provided to the target organization tool 211, but may also output additional content generated by the target organization tool 211 for the management of the content by the tool 211. For example, the target organization tool 211 may be provided with files of content, which it may virtually write to the non-volatile storage 103, in addition to file headers, metadata, etc. generated for maintaining a specific file system format. Thus, step 506 also captures the actual content virtually written by the target organization tool 211.

In step 508, the device 102 may detect whether the virtually written content captured in step 506 was original content stored in the non-volatile storage 103 according to the original organization scheme 213 or was content not stored as part of the original content of the original organization scheme 213, such as metadata. If content is determined to be original content stored according to the original organization scheme, then, in step 510, a copy update command may be generated to copy the corresponding content from the obtained original location in the non-volatile storage 103 to the detected target location based on the target organization scheme 214. If the content is determined to not be original content, then, in step 512, the device 102 may generate an insert update command to insert the corresponding content into the detected target location based on the target organization scheme 214.

In some embodiments, commands generated as part of steps 510 and 512 may be considered the sequence of update commands used to generate the target storage units 209 in the non-volatile storage 103 based on the target organization scheme 214. In some instances, the generated sequence of update commands may be generated into one or more update packages, such as to be executed by the device 102 in order to reorganize the non-volatile storage 103.

In some embodiments, the method 500 may also include step 514. In step 514, content stored in the non-volatile storage 103 may be backed up to a designated non-volatile storage area of the device 102. In a further embodiment, the non-volatile storage area may be a specific storage unit(s) or partition(s) in the non-volatile storage 103. In some instances, step 514 may be performed to ensure a reliable/failsafe reorganization of the stored content. It will be apparent to persons having skill in the relevant art that step 514 may be an optional step.

In step 516, any potential WbR conflicts may be identified (e.g., by the conflict resolution module 342) based on the built sequence of update commands. In step 518, the device 102 may determine if any potential WbR conflicts were identified in step 516. If no conflicts were identified, then the method 500 may proceed to step 524. If conflicts were identified, then, in some embodiments, the backing up of content corresponding to identified WbR conflicts may be performed in step 520. It will be apparent to persons having skill in the relevant art that step 520 may be optional and performed only in instances where the backing up of content may be necessary to resolve identified WbR conflicts. In some embodiments, steps 510 and/or 512 may further include generated commands configured to optimize the backing up to be performed in steps 514 and/or 520 such that the amount of storage space and/or time required for the backing up is reduced.

In step 522, the identified WbR conflicts may be resolved (e.g., by the conflict resolution module 342). In some embodiments, the resolution of the identified potential WbR conflicts may be achieved by the performance of at least one of: reordering of the sequence of update commands, adding update commands, deleting update commands, or modifying update commands. In step 524, the device 102 (e.g., the execution module 334 therein) may execute the sequence of update commands to reorganize the content stored in the non-volatile storage 103. It will be apparent to persons having skill in the relevant art that steps 520 and 522, or in some instances steps 516-522, may be performed concurrently and/or intermittently with step 524. For example, WbR conflicts may be identified as they arise during execution of the update commands, and resolutions performed as part of or concurrently with the sequence of update commands.

Computer System Architecture

FIG. 6 illustrates a computer system 600 in which embodiments of the present disclosure, or portions thereof, may be implemented as computer-readable code. For example, the device 102, the mobile network operator 112, and the reorganization instructions generator 122 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 5 and 6.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device. The processor device 604 may be connected to a communications infrastructure 606, such as a bus, message queue, network, multi-core message-passing scheme, etc. The network (e.g., the communications network 180) may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory (RAM), read-only memory (ROM), etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive, the removable storage unit 618 may be a floppy disk. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art. It will be apparent to persons having skill in the relevant art that methods disclosed herein for the in-place reorganization of contents may be performed on any of the memories included in the computer system 600 suitable for content reorganization.

Data stored in the computer system 600 (e.g., in the main memory 608 and/or the secondary memory 610) may be stored on any type of suitable computer readable media, such as optical storage (e.g., a compact disc (CD), digital versatile disc (DVD), Blu ray™ disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

Computer program medium and computer usable medium may refer to memories, such as the main memory 608 and secondary memory 610, which may be semiconductor memories (e.g. dynamic random-access memories (DRAMs), etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the method illustrated by FIG. 5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The present disclosure provides, among other features, systems and methods for the in-place reorganization of content in non-volatile storage. While various exemplary embodiments of the disclosed system and method have been described above, it should be understood that they have been presented for purposes of example only, not limitation. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for in-place reorganization of content stored in a non-volatile storage of a computing device and organized according to an original organization scheme having at least one original storage unit and an original organization logic associated therewith, to a target organization scheme having at least one target storage unit and a target organization logic associated therewith, the method comprising:

obtaining, by the computing device, instructions to reorganize the content in the non-volatile storage of the computing device from the original organization scheme to a defined target organization scheme;

after obtaining said reorganization instructions, generating, by the computing device, based on (i) the obtained reorganization instructions and (ii) an application of the target organization logic to a virtual storage, a sequence of update commands for generating in the non-volatile storage the at least one target storage unit organized according to the defined target organization scheme, wherein each obtained reorganization instruction is a basis for the generation of one or more update commands; and executing, by the computing device, the sequence of update commands, generated by the computing device on a basis of said obtained reorganization instructions, on the non-volatile storage to reorganize the content in the non-volatile storage from the original organization scheme to the defined target organization scheme.

2. The method of claim 1, wherein the at least one original storage unit or at least one target storage unit is not necessarily contiguous in the non-volatile storage.

3. The method of claim 1, further comprising:
identifying, based on the sequence of update commands, potential write-before-read conflicts; and
resolving the identified potential write-before-read conflicts.

4. The method of claim 3, further comprising:
backing up content from the non-volatile storage required for enabling failsafe reorganization, to a backup in a designated non-volatile storage area of the computing device.

5. The method of claim 3, wherein the resolving comprises one or more of:
reordering the sequence of update commands;
backing up content corresponding to an identified potential write-before-read conflict, to a backup in a designated non-volatile storage area of the computing device;
adding update commands;
deleting update commands; and
altering update commands.

6. The method of claim 5, wherein the generating of the sequence of update commands further comprises optimizing the backing up by reducing the amount of storage required for the backup or the time required to create the backup.

7. The method of claim 1, wherein the instructions include instructions to update the content.

8. The method of claim 1, wherein:
the non-volatile storage comprises a plurality of partitions each having respective organization logic associated with it;
the original and target organization schemes each includes a partition layout indicating sizes, locations and formats of the plurality of partitions; and
the instructions include instructions to repartition the non-volatile storage from an original partition layout to a defined target partition layout.

9. The method of claim 8, wherein the instructions to repartition comprise at least one of: move, reformat, change format, defragment, create, resize, delete and update commands for respective partitions of the plurality of partitions.

10. The method of claim 9, wherein:
the plurality of partitions contains at least one file system partition storing data in a specific file system format.

11. The method of claim 10, wherein:
the device operates according to a Linux or an Android operating system; and
the at least one file system partition is a fourth extended file system (ext4) partition.

12. The method of claim 1, wherein the generating of the sequence of update commands comprises:
obtaining the content stored in the non-volatile storage organized according to the original organization scheme by using the original organization logic;
applying the target organization logic to the obtained content for virtually writing the obtained content to a virtual storage;
capturing data elements virtually written by the target organization logic to their respective target locations in the non-volatile storage without necessarily writing to the non-volatile storage;
determining, for the data elements, whether they are part of the content stored in the non-volatile storage;
for data elements that are determined to not be part of the content stored in the non-volatile storage, generating update commands for storing these data elements to their respective target locations; and
for data elements that are determined to be part of the content stored in the non-volatile storage, (i) determining their original locations in the non-volatile storage and (ii) creating, as part of the update commands, a mapping between their original locations in the non-volatile storage and their respective target locations in the non-volatile storage.

13. The method of claim 12, wherein the original locations and target locations are absolute locations in the non-volatile storage.

14. The method of claim 12, wherein the original locations and target locations are relative to actual starting locations in the non-volatile storage, the method further comprising, prior to the executing of the update commands:
obtaining the actual starting locations in the non-volatile storage; and
adjusting the locations in the update commands based on the actual starting locations.

15. The method of claim 1, wherein the computing device remains operational during the reorganizing.

16. The method of claim 1, wherein the obtaining of instructions includes generating instructions internally on the device in accordance with an internal rule.

17. The method of claim 1, wherein the obtaining of instructions includes receiving instructions from an external source.

18. A non-transitory computer readable medium having program logic stored thereon that, if executed by a computing device having a non-volatile storage with an original organization scheme including a plurality of original storage units each having a respective, original organization logic associated therewith, cause the computing device to:
obtain instructions to reorganize the non-volatile storage of the computing device from the original organization scheme to a defined target organization scheme having a plurality of target storage units, each having a respective, target organization logic associated therewith;
generate, on the computing device, based on the obtained instructions and a simulation of the target organization logics, a sequence of update commands for generating the plurality of target storage units in the non-volatile storage, wherein each obtained reorganization instruction is a basis for the generation of one or more update commands;

identify, based on the sequence of update commands generated on the basis of said obtained reorganization instructions, potential write-before-read conflicts that may result in data in the non-volatile storage being overwritten if the update commands are carried out;

resolve the identified potential write-before-read conflicts; and execute the update commands on the non-volatile storage to reorganize the content in the non-volatile storage from the original organization scheme to the defined target organization scheme.

19. The computer readable medium of claim 18, wherein the computing device is a mobile computing device.

20. The computer readable medium of claim 18, wherein the original organization scheme comprises a file system or database including a plurality of data elements, and wherein the program logic further causes the computing device to:

create a mapping between the plurality of data elements in the original organization scheme and a plurality of target data elements in the defined target organization scheme; and for each data element of the file system or database:
search for data blocks in the non-volatile storage containing contents of the data element;
simulate the original organization scheme and record original locations in the non-volatile storage corresponding to the data blocks; and
simulate the defined target organization scheme to record write locations of the target organization tool without writing to the non-volatile storage.

21. The computer readable medium of claim 20, wherein the write locations are:
locations in the non-volatile storage relative to a starting location; and
absolute locations in the non-volatile storage.

22. The computer readable medium of claim 21, wherein the program logic further causes the computing device to:
determine an actual starting location in the non-volatile storage;
generate copy commands to copy the data blocks from their respective original locations to the recorded write locations; and
alter the write locations of the copy commands based on the actual starting location.

23. The computer readable medium of claim 22, wherein the actual starting location is 0 and the actual starting location is based on the original organization scheme in the non-volatile storage.

24. The computer readable medium of claim 20, wherein the data elements comprise files and records.

25. A system for in-place reorganization of non-volatile storage, the system comprising:

a computing device including a non-volatile storage having an original organization scheme, said computing device being configured to obtain instructions to reorganize the non-volatile storage, of the computing device, from the original organization scheme to a defined target organization scheme having at least one target storage unit and a target organization logic associated therewith;

generate, on the computing device, based on the obtained reorganization instructions and a simulation of the target organization logic, a sequence of update commands for generating the at least one target storage unit in the non-volatile storage, wherein each obtained reorganization instruction is a basis for the generation of one or more update commands;

invoke the target organization logic to identify, based on the sequence of update commands generated on the basis of said obtained reorganization instructions, potential write-before-read conflicts that may result in data in the non-volatile storage, of the computing device, being overwritten if the update commands are carried out;

resolve the identified potential write-before-read conflicts by re-sequencing update commands associated with identified conflicts; and execute the update commands on the non-volatile storage to reorganize the content in the non-volatile storage from the original organization scheme to a defined target organization scheme.

26. The system of claim 25, wherein the computing device is further configured to simulate the target organization logic to record its targeted write locations in the non-volatile storage without writing to the non-volatile storage.

* * * * *